United States Patent [19]

Beaton et al.

[11] Patent Number: 5,124,027
[45] Date of Patent: * Jun. 23, 1992

[54] MULTI-STAGE PROCESS FOR DEASPHALTING RESID, REMOVING CATALYST FINES FROM DECANTED OIL AND APPARATUS THEREFOR

[75] Inventors: William I. Beaton, Wheaton; James L. Taylor, Naperville; Jeffrey J. Kolstad, Glen Ellyn; Brian S. Kennedy, Flossmoor; Robert D. Hughes, Naperville, all of Ill.

[73] Assignee: Amoco Corporation, Chicago, Ill.

[*] Notice: The portion of the term of this patent subsequent to Jun. 23, 2009 has been disclaimed.

[21] Appl. No.: 616,218

[22] Filed: Nov. 20, 1990

Related U.S. Application Data

[63] Continuation-in-part of Ser. No. 381,372, Jul. 18, 1989, Pat. No. 5,013,427.

[51] Int. Cl.5 ............................................. C10G 21/00
[52] U.S. Cl. ..................... 208/309; 208/86; 208/87; 208/162; 208/212; 208/251 H; 208/254 H; 208/96; 208/229
[58] Field of Search ............... 208/309, 311, 314, 315, 208/320, 212, 312, 162, 86, 87, 96

[56] References Cited

U.S. PATENT DOCUMENTS

| | | | |
|---|---|---|---|
| 2,692,222 | 10/1954 | Packie | 208/311 |
| 2,900,308 | 8/1959 | Matyear, Jr. | 208/311 |
| 3,798,157 | 3/1974 | Manzanilla et al. | 208/309 |
| 4,354,922 | 10/1982 | Derbyshire et al. | 208/309 |

Primary Examiner—Helane Myers
Attorney, Agent, or Firm—Thomas W. Tolpin; William H. Magidson; Frank J. Sroka

[57] ABSTRACT

The invention reduces cracking catalyst fines in decanted oil by mixing the decanted oil (DCO) containing cracking catalyst fines with a resid oil and then treating the DCO-resid mixture with a non-aromatic hydrocarbon solvent in an extraction unit or in a multi-stage deasphalting unit.

22 Claims, 3 Drawing Sheets

MULTI-STAGE PROCESS FOR DEASPHALTING RESID, REMOVING CATALYST FINES FROM DECANTED OIL AND APPARATUS THEREFOR

CROSS-REFERENCE TO RELATED APPLICATION

The present invention is a continuation-in-part of copending application Ser. No 07/381,372 filed Jul. 18 1989

BACKGROUND OF THE INVENTION

The present invention relates to an improved process for deasphalting resid and substantially removing cracking catalyst fines from decanted oil.

Catalytic cracking of oil is an important refinery process which is used to produce gasoline and other hydrocarbons. During catalytic cracking, the feedstock, which is generally a cut or fraction of crude oil, is cracked in a reactor under catalytic cracking temperatures and pressures in the presence of a catalyst to produce more valuable, lower molecular weight hydrocarbons. Gas oil is usually used as a feedstock in catalytic cracking. Gas oil feedstocks typically have a boiling range from 650° F. to 1000° F. and less than 1% RAMS carbon by weight. Gas oil feedstocks also typically contain less than 5% by volume naphtha and lighter hydrocarbons having a boiling temperature below 430° F., from 10% to 30% by volume diesel and kerosene having a boiling range from 430° F. to 650° F., and less than 10% by volume resid having a boiling temperature above 1000° F. It is desirable to provide an effective process to increase the yield of gasoline (naphtha) in catalytic cracking units.

It has been known to deasphalt and catalytically crack virgin unhydrotreated, low sulfur resid as well as to deasphalt, subsequently hydrotreat, and catalytically crack high sulfur resid. However, better demetalization and higher resid conversion are desirable.

Furthermore, such prior art processes produce hydrogen-rich asphaltenes which are difficult and expensive to handle and process, melt (liquify) at relatively low temperatures, and which cannot be used as solid fuel. Asphaltenes are difficult to blend into fuel oils, and are not generally usable and desirable for asphalt paving or for use in other products.

In the past, spiraling oil costs and extensive price fluctuations have created instability and uncertainty for net oil consuming countries, such as the United States. It has been difficult to attain adequate supplies of high-quality, low-sulfur petroleum crude oil (sweet crude) from Nigeria, Norway, and other countries at reasonable prices for conversion into gasoline, fuel oil, and petrochemical feedstocks. In an effort to stabilize the supply and availability of crude oil at reasonable prices, Amoco Oil Company has developed, constructed, and commercialized extensive, multimillion dollar refinery projects under the Second Crude Replacement Program (CRP II) to process poorer quality, high-sulfur petroleum crude oil (sour crude) and demetalate, desulfurize, and hydrocrack resid to produce high-value products, such as gasoline, distillates, catalytic cracker feed, metallurgical coke, and petrochemical feedstocks. The Crude Replacement Program is of great benefit to the oil-consuming nations since it provides for the availability of adequate supplies of gasoline and other petroleum products at reasonable prices while protecting the downstream operations of refining companies.

During resid hydrotreating, such as under Amoco Oil Company's Crude Replacement Program, resid oil is upgraded with hydrogen and a hydrotreating catalyst to produce more valuable lower-boiling liquid products. However, undesirable carbonaceous solids are formed during resid hydrotreating. These solids have been characterized as multicondensed aromatics which form and precipitate from cracking of the side chains of asphaltenes. These carbonaceous solids are substantially insoluble in hexane, pentane, and in the effluent hydrotreated product oil. The solids become entrained and are carried away with the product. Such solids tend to stick together, adhere to the sides of vessels, grow bigger, and agglomerate. Such solids are more polar and less soluble in other hydrocarbons than the residual oil feedstock. Carbonaceous solids are produced as a reaction by-product during ebullated bed hydrotreating (expanded bed hydrotreating). During ebullated bed hydrotreating, the ebullating hydrotreating catalyst fines can serve as a nucleus and center for asphaltene growth. The situation becomes even more aggravated when two or more hydrotreating reactors are connected in series as in many commercial operations. In such cases, solids formed in the first reactor not only form nucleation sites for solids growth and agglomeration in the first reactor, but are carried over with the hydrotreated product oil into the second reactor, etc., for even larger solids growth and agglomeration.

The concentration of carbonaceous solids increases at more severe hydrotreating conditions, at higher temperatures and at higher resid conversion levels. The amount of carbonaceous solids is dependent on the type of feed. Operability at high resid conversion is limited by the formation of carbonaceous solids.

Solids formed during resid hydrotreating cause deposition and poor flow patterns in the reactors, as well as fouling, plugging, and blocking of conduits and downstream equipment. Oils laden with solids cannot be efficiently or readily pipelined. Hydrotreating solids can foul valves and other equipment, and can build up insulative layers on heat exchange surfaces reducing their efficiency. Buildup of hydrotreated solids can lead to equipment repair, shutdown, extended downtime, reduced process yield, decreased efficiency, and undesired coke formation.

Decanted oil (DCO) is a valuable solvent and is used advantageously in the resid hydrotreating unit for controlling the carbonaceous solids therein. However, decanted oil is normally obtained from a catalytic cracking unit and contains cracking catalyst solids or fines therein. These fines are small particles made up of the catalyst used in the catalytic cracking unit.

For a fluid catalytic cracking unit, the preferred cracking catalysts are those containing crystalline aluminosilicates, zeolites, or molecular sieves in an amount sufficient to materially increase the cracking activity of the catalyst, e.g., between about 1 and about 25% by weight. The crystalline aluminosilicates can have silica-to-alumina mole ratios of at least about 2:1, such as from about 2 to 12:1, preferably about 4 to 6:1 for best results. The crystalline aluminosilicates are usually available or made in sodium form. This component is preferably reduced, for instance, to less than about 4 or even less than about 1% by weight through exchange with hydrogen ions, hydrogen-precursors such as ammonium ions, or polyvalent metal ions.

Suitable polyvalent metals include calcium, strontium, barium, and the rare earth metals such as cerium, lanthanum, neodymium, and/or naturally-occurring mixtures of the rare earth metals. Such crystalline materials are able to maintain their pore structure under the high temperature conditions of catalyst manufacture, hydrocarbon processing, and catalyst regeneration. The crystalline aluminosilicates often have a uniform pore structure of exceedingly small size with the cross-sectional diameter of the pores being in a size range of about 6 to 20 angstroms, preferably about 10 to 15 angstroms.

Silica-alumina based cracking catalysts having a significant proportion of silica, e.g., about 40 to 90 weight percent silica and about 10 to 60 weight percent alumina, are suitable for admixture with the crystalline aluminosilicate or for use as such as the cracking catalyst.

The decanted oil cracking catalyst fines are more abrasive than resid hydrotreating unit (RHU) fines. The cracking catalyst fines in decanted oil are abrasive and have a tendency to put undue wear on the valves and various feed product controls used to convey the decanted oil during its use as a solvent.

Our U.S. Pat. No. 4,940,529 teaches a solvent extraction deasphalting unit for hydrotreated resid from vacuum tower bottoms. The solvent extraction unit comprises a mixer and two or three separator vessels or zones operated slightly below or above the supercritical conditions of the solvent.

Our U.S. Pat. No. 4,808,298 is directed to resid hydrotreating and to a minimization of the formation of carbonaceous solids from hydrotreating. Pat. No. 4,808,298 does this by treating the resid oil feedstock or hydrotreated oil with an aromatic diluent such as decanted oil obtained from the decanted oil line of a fluid catalytic cracker unit. The process illustrated in U.S. Pat. No. 4,808,298 injects the decanted oil diluent into the atmospheric tower and the vacuum tower.

Over the years a variety of processes and equipment have been suggested for refining operations. Typifying some of those prior art processes and equipment are those described in U.S. Pat. Nos:

| | | | |
|---|---|---|---|
| 2,360,272 | 3,579,436 | 4,302,323 | 4,486,295 |
| 2,382,382 | 3,635,815 | 4,305,814 | 4,495,060 |
| 2,398,739 | 3,661,800 | 4,331,533 | 4,502,944 |
| 2,398,759 | 3,681,231 | 4,332,674 | 4,521,295 |
| 2,414,002 | 3,766,055 | 4,341,623 | 4,040,958 |
| 2,425,849 | 3,796,653 | 4,341,660 | 4,525,267 |
| 2,436,927 | 3,838,036 | 4,381,987 | 4,526,676 |
| 2,755,229 | 3,844,936 | 4,391,700 | 4,592,827 |
| 2,879,224 | 3,905,892 | 4,400,264 | 4,606,809 |
| 2,884,303 | 3,909,392 | 4,405,441 | 4,617,175 |
| 2,981,676 | 3,923,636 | 4,434,045 | 4,618,412 |
| 2,985,584 | 3,948,756 | 4,439,309 | 4,622,210 |
| 3,004,926 | 4,082,648 | 4,446,002 | 4,640,762 |
| 3,039,953 | 4,137,149 | 4,447,313 | 4,655,903 |
| 3,168,459 | 4,158,622 | 4,451,354 | 4,661,265 |
| 3,338,818 | 4,176,048 | 4,454,023 | 4,662,669 |
| 3,351,548 | 4,191,636 | 4,457,830 | 4,673,485 |
| 3,513,087 | 4,239,616 | 4,457,831 | 4,681,674 |
| 3,563,911 | 4,285,804 | 4,478,705 | 4,686,028 |
| 3,364,136 | 4,290,880 | 4,485,004 | 4,692,318 |
| 4,695,370 | 4,743,356 | 4,767,521 | 4,773,986 |
| 4,720,337 | 4,753,721 | 4,769,127 | 4,808,289 |
| | | | 4,818,371 |

It is, therefore, desirable to provide an improved process for substantially reducing the amount of cracking catalyst fines in decanted oil and to provide an improved process for deasphalting resid.

DEFINITIONS

The term "asphaltenes" as used herein, means asphaltenes which have been separated and obtained from a deasphalting unit. Asphaltenes comprise a heavy polar fraction. The asphaltene fraction is the residue which remains after the resins and oils have been separated from resid in a deasphalting unit. Asphaltenes from vacuum resid are generally characterized as follows: a Conradson or Ramsbottom carbon residue of 30 to 90 weight % and a hydrogen to carbon (H/C) atomic ratio of 0.5% to less than 1.2%. Asphaltenes can contain from 50 ppm to 5000 ppm vanadium and from 20 ppm to 2000 ppm nickel. The sulfur concentration of asphaltenes can be from 110% to 250% greater than the concentration of sulfur in the resid feed oil to the deasphalter. The nitrogen concentration of asphaltenes can be from 110% to 350% greater than the concentration of nitrogen in the resid feed oil to the deasphalter.

As used herein, the terms "deasphalting unit" and "deasphalter" mean one or more vessels or other equipment which are used to separate asphaltenes from oils and resins.

The term "deasphalted oil" as used herein means a product produced from a resid wherein the asphaltenes are substantially removed from the resid.

The term "fine-lean DCO", or "fine-free DCO" as used herein, means decanted oil having less than 20 ppm silica and less than 20 ppm alumina.

The term "low sulfur" resid as used herein means a resid comprising less than 2% by weight sulfur. Resid containing sulfur, other than low sulfur resid, is sometimes characterized as high sulfur resid.

The term "resins" as used herein, means resins that have been separated and obtained from a deasphalting unit. Resins are denser or heavier than deasphalted oil and comprise more aromatic hydrocarbons with highly aliphatic substituted side chains. Resins, which also comprise metals, such as nickel and vanadium. Resins from vacuum resid can be generally characterized as follows: a Conradson or Ramsbottom carbon residue of 10 to less than 30 weight % and a hydrogen to carbon (H/C) atomic ratio of 1.2% to less than 1.5%. Resins can contain 1000 ppm or less of vanadium and 300 ppm or less of nickel. The sulfur concentration in resins can be from 50% to 200% of the concentration of sulfur in the resid oil feed to the deasphalter. The nitrogen concentration in resins can be from 30% to 250% of the concentration of nitrogen in the resid oil feed in the deasphalter.

The terms "resid oil" and "resid" as used herein, mean residual oil.

The term "solvent-extracted oil" (SEU oil) as used herein, means substantially deasphalted, substantially deresined oil which has been separated and obtained from a solvent extraction unit.

The term "solvent extraction unit" (SEU) as used herein, means a deasphalter in which resid is separated into deasphalted oil and asphaltenes by means of one or more solvents.

The term "supercritical conditions" as used herein, means a condition in a deasphalting unit where the solvent does not exist in both a vapor phase and a liquid phase. Under such circumstances, the solvent is generally in a gaseous or vapor phase.

SUMMARY OF THE INVENTION

In keeping with one aspect of the invention, we provide an improved process for deasphalting resid and for reducing fines in decanted oil. We mix decanted oil containing cracking catalyst fines with the resid to form a DCO-resid mixture. Then we treat the DCO-resid mixture with a solvent extraction unit or a two-stage deasphalting unit.

The resid may be the heavy fraction product from a resid hydrotreating unit (RHU), a hydrotreated resid from vacuum tower bottoms (RHU-VTB), atmospheric tower bottom resid, a low sulfur resid (LSR) or a high sulfur resid. In many instances, a high sulfur crude is fed to a hydrotreating unit or a plurality of hydrotreating units. The resids from the resid hydrotreating units (RHU) can be further fractionated in a fractionator such as in an atmospheric tower and/or vacuum tower, leaving resid bottoms.

The resid bottoms which are mixed with the DCO containing catalytic fines are further separated into separate streams of asphaltenes, and fine-lean DCO-resin-oil mixture in a deasphalting unit, preferably a two-stage solvent extraction unit operated with supercritical solvent recovery. The deasphalted, solvent-extracted DCO-resin-oil mixture, also referred to as deasphalted oil (DAO), is preferably recycled to the ebullated bed reactor of the resid hydrotreating unit as part of the feedstock. The asphaltenes can be transported for use as solid fuel. Some of the asphaltenes can also be fed to the coker and coked, or passed to a calciner for subsequent use as coke in a metal processing mill.

The asphaltenes which have been hydrotreated and separated in a deasphalter, preferably a solvent extraction unit, in contrast to virgin asphaltenes, have relatively low sulfur, typically less than 3.5% by weight, and can be used directly as solid fuel.

Hydrotreated deasphalted oils generally contain low concentrations of RAMS carbon (ramsbottom carbon), sulfur, and metals, and are especially useful as catalytic cracker feed. It is unexpected to be able to isolate a large fraction (about 40–70 wt%) of deasphalted oil from the vacuum bottoms effluent that has low RAMS carbon, because hydrotreating generally causes the RAMS carbon in the vacuum bottoms to increase about 50% or more relative to the virgin unhydrotreated vacuum residue. Also, it was surprisingly found that the increase in RAMS carbon in the hydrotreated vacuum bottoms is due to a selective increase in the concentration of RAMS carbon in the asphaltene fraction, while the RAMS carbon content of the deasphalted oils and resins are relatively unchanged compared to virgin unhydrotreated resid.

More than 95% by weight of the metals in the vacuum bottoms were removed from the deasphalted oil during solvent extraction. These peculiar findings make the deasphalting of hydrotreated vacuum bottoms a particularly attractive alternative to direct delayed coking in that the asphaltene fraction is so refractory and of such a low reactivity as to produce such a small oil yield that it is economically used as a solid fuel. The deasphalted oil and/or resins have substantially no silica fines (less than 20 ppm). Thus, DCO recovered from the fractionators has substantially no cracking catalyst fines and can be advantageously used as a solvent to control the formation of carbonaceous solids in the hydrotreating unit. Furthermore, the hydrotreated resins fraction is comparable in reactivity to virgin resid and converts efficiently and effectively in to lighter products upon recycle to the resid hydrotreating unit.

The method of our invention generally uses a resid selected from hydrotreated resid, low sulfur resid (LSR), high sulfur resid, and preferably vacuum tower bottoms from a resid hydrotreating unit. The solvent used for the solvent extraction is selected from non-aromatic hydrocarbon solvents having 3 to 7 carbon atoms and mixtures of the solvents. The preferred solvents are butane, pentane, isomers thereof and mixtures thereof.

We provide two solvent separators operated near or above critical conditions wherein the resid, decanted oil (DCO) containing cracking catalyst fines and hydrocarbon solvent are fed to a first separator. In this regard, preferably the resid and DCO are first mixed with each other and then mixed with the solvent. Preferably the major portion of the solvent or all of the solvent is added directly to the first extractor.

Optionally when RHU-VTB or a similar type of resid is used, a LSR may be used along with the DCO.

The first separator separates a substantial amount of the cracking catalyst fines from the DCO and a substantial amount of the metals from the resid. The metals and fines are wet and held by the asphaltene phase formed in the first separator. The asphaltene phase is removed from the first separator as a solvent-extracted deresined asphaltene.

Also extracted from the first separator is a mixture of DCO from which the cracking catalyst fines have been substantially removed (containing less than 20 ppm silica and less than 20 ppm alumina), resin, oil and solvent (fine-lean DCO-resin-oil-solvent mixture). The fine-lean DCO-resin-oil-solvent mixture is conveyed to a second separator unit. The second separator unit is at or above critical conditions. The solvent is recovered from the second separator and recycled to the first separator and/or to the mixer as needed. Also extracted from the second separator is a mixture of fine-lean DCO, resin and oil (fine-lean DCO-resin-oil mixture). This substantially fine-lean DCO-resin-oil mixture may be further treated if desired or used as is and fed to a hydrotreating unit.

A more detailed explanation is provided in the following description and appended claims taken in conjunction with the accompanying drawings.

DETAILED DESCRIPTION OF THE PREFERRED EMBODIMENT

Figure 1:
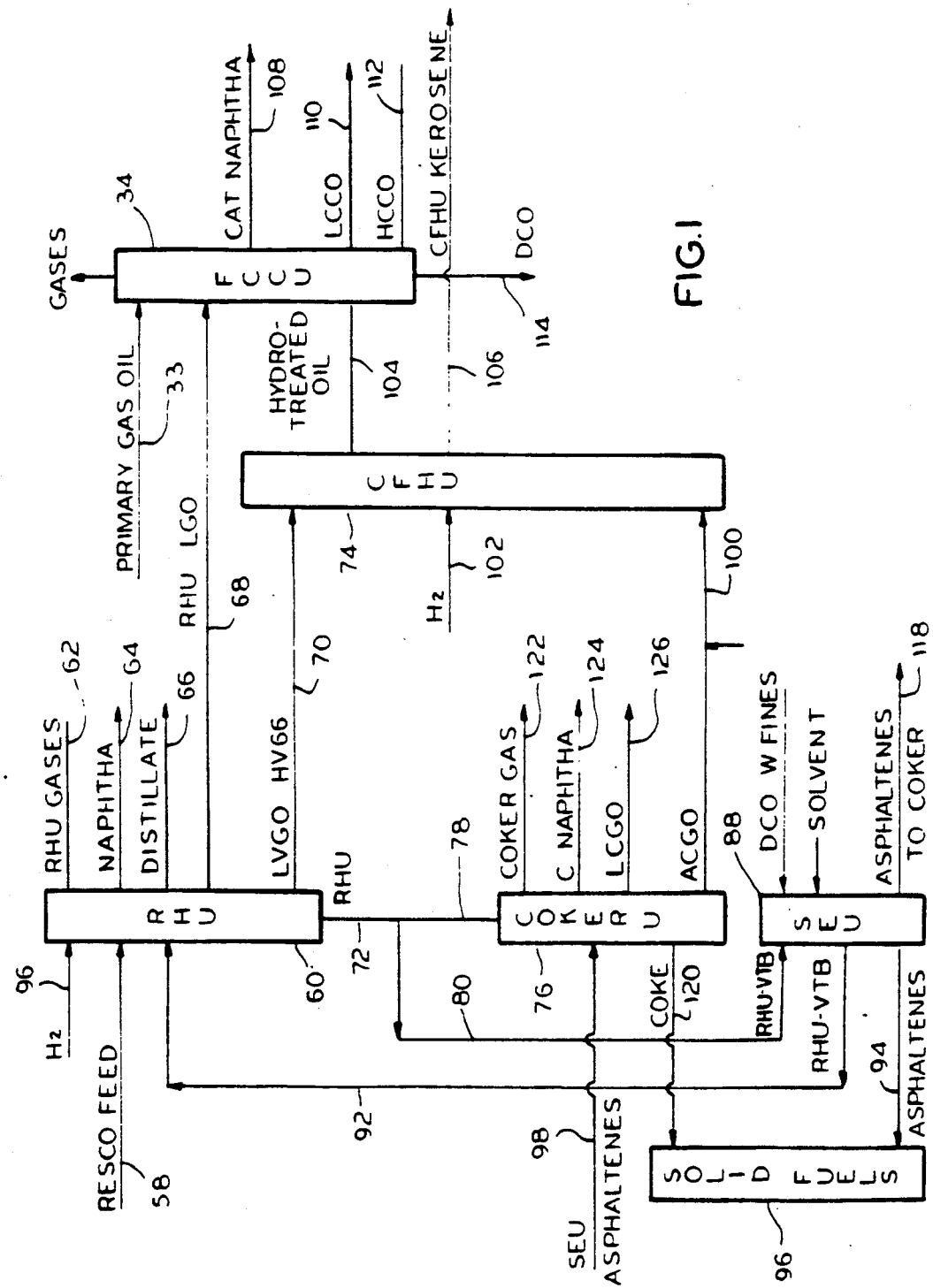
FIG. 1 is a schematic flow diagram of a refinery in accordance with principles of the present invention.

In refining (FIG. 2), unrefined, raw, whole crude oil (petroleum) is withdrawn from an above ground storage tank 10 at about 75° F. to about 80° F. by a pump 12 and pumped through feed line 14 into one or more desalters 16 to remove particulates, such as sand, salt, and metals, from the oil. The desalted oil is fed through furnace inlet line 18 into a pipestill furnace 20 where it is heated to a temperature, such as to 750° F. at a pressure ranging from 125 to 200 psi. The heated oil is removed from the furnace through exit line 22 by a pump 24 and pumped through a feed line 25 to a primary distillation tower 26.

The heated oil enters the flash zone of the primary atmospheric distillation tower, pipestill, or crude oil unit 26 before proceeding to its upper rectifier section or the lower stripper section. The primary tower is preferably operated at a pressure less than 60 psi. In the primary tower, the heated oil is separated into fractions of wet gas, light naphtha, intermediate naphtha, heavy naphtha, kerosene, virgin gas oil, and primary reduced crude. A portion of the wet gas, naphtha, and kerosene is preferably refluxed (recycled) back to the primary tower to enhance fractionation efficiency.

Wet gas is withdrawn from the primary tower 26 through overhead wet gas line 28. Light naphtha is removed from the primary tower through light naphtha line 29. Intermediate naphtha is removed from the primary tower through intermediate naphtha line 30. Heavy naphtha is withdrawn from the primary tower 26 through heavy naphtha line 31. Kerosene and oil for producing jet fuel and furnace oil are removed from the primary tower through kerosene line 32. Primary virgin, atmospheric gas oil is removed from the primary tower through primary gas oil line 33 and pumped to the fluid catalytic cracking unit (FCCU) 34 (FIG. 1).

Primary reduced crude is discharged from the bottom of the primary tower 26 (FIG. 2) through the primary reduced crude line 35. The primary reduced crude in line 35 is pumped by pump 36 into furnace 38 where it is heated, such as to a temperature from about 520° F. to about 750° F. The heated primary reduced crude is conveyed through a furnace discharge line 40 into the flash zone of a pipestill vacuum tower 42.

The pipestill vacuum tower 42 is preferably operated at a pressure ranging from 35 to 50 mm of mercury. Steam is injected into the bottom portion of the vacuum tower through steam line 44. In the vacuum tower, wet gas is withdrawn from the top of the tower through overhead wet gas line 46. Heavy and/or light vacuum gas oil are removed from the middle portion of the vacuum tower through heavy gas oil line 48. Vacuum-reduced crude is removed from the bottom of the vacuum tower through vacuum-reduced crude line 50. The vacuum-reduced crude typically has an initial boiling point near about 1000° F.

The vacuum-reduced crude, also referred to as resid, resid oil, and virgin unhydrotreated resid, is pumped through vacuum-reduced crude lines 50 and 52 by a pump 54 into a feed drum or surge drum 56. Resid oil is pumped from the surge drum through resid feed line 58 (FIG. 1 into a resid hydrotreating unit complex 60 (RHU) which has a plurality of resid hydrotreating units and associated refining equipment.

Each resid hydrotreating unit can be a reactor train comprising a cascaded series or set of ebullated bed reactors. Hydrogen is injected into the ebullated bed reactors and a relatively high sulfur resid or sour crude is fed to the reactor where it is hydroprocessed (hydrotreated) in the presence of ebullated (expanded) fresh and/or equilibrium hydrotreating catalyst and hydrogen to produce an upgraded effluent product stream with reactor tail gas (effluent off gases) leaving used spent catalyst. Hydroprocessing in the RHU includes demetallation, desulfurization, denitrogenation, resid conversion, oxygen removal (deoxygenation), hydrocracking, removal of Rams carbon, and the saturation of olefinic and aromatic hydrocarbons.

Each of the reactor trains has a plurality of reactors in series, i.e. ebullated bed reactors. The oil feed is typically resid oil (resid) and heavy gas oil. The feed gas comprises upgraded recycle gases and fresh makeup gases. Demetallation primarily occurs in the first ebullated bed reactor in each train. Desulfurization occurs throughout the ebullated bed reactors in each train. The effluent product stream typically comprises light hydrocarbon gases, hydrotreated naphtha, distillates, light and heavy gas oil, and unconverted hydrotreated resid. The hydrotreating catalyst typically comprises a metal hydrogenating component dispersed on a porous refractory, inorganic oxide support.

The resid hydrotreating unit is quite flexible and, if desired, the same catalyst can be fed to one or more of the reactors; or, a separate demetallation catalyst can be fed to the first reactor while a different catalyst can be fed to the second and/or third reactors. Alternatively, different catalysts can be fed to each of the reactors, if desired. The used and spent catalyst typically contains nickel, sulfur, vanadium, and carbon (coke). Many tons of catalyst are transported into, out of, and replaced in the ebullated bed reactors daily.

Although we have just described the use of ebullated bed reactors, fixed bed reactors may also be used. The ebullated bed reactors are preferred.

As shown in FIG. 1, the products produced from the resid hydrotreating units in the ebullated bed reactors include: light hydrocarbon gases (RHU gases) in gas line 62; naphtha comprising light naphtha, intermediate naphtha, heavy naphtha and vacuum naphtha in one or more naphtha lines 64; distillate comprising light distillate and mid-distillate in one or more distillate lines 66; light gas oil in gas oil line 68; light vacuum gas oil and heavy vacuum gas oil in one or more vacuum gas oil lines 70; and hydrotreated vacuum resid comprising vacuum tower bottoms in a vacuum resid line 72.

Light and intermediate naphthas can be sent to a vapor recovery unit for use as gasoline blending stocks and reformer feed. Heavy naphtha can be sent to the reformer to produce gasoline. The mid-distillate oil is useful for producing diesel fuel and furnace oil, as well as for conveying and/or cooling the spent catalyst.

Light gas oil from a RHU is useful as feedstock for the catalytic cracking unit 34. Light and heavy vacuum gas oils can be upgraded in a catalytic feed hydrotreating unit 74 (CFHU). Some of the hydrotreated resid from vacuum tower bottoms (RHU-VTB) can be sent to the coker unit 76 via coker inlet line 78 to produce coke. A substantial portion of the RHU-VTB is fed through a feeder line or inlet line 80 to a deasphalter, deasphalting unit or solvent extraction unit (SEU) 88 where the RHU-VTB is separated into mixture of deasphalted oil and resins, and asphaltenes.

Decanted oil (DCO) with cracker catalyst fines is fed through feeder line 116 to the SEU 88. The DCO and resid are mixed in the SEU 88.

In one embodiment, the deasphalter 88 (FIG. 1) comprises a solvent extraction unit operated with supercritical solvent recovery. A mixture of deasphalted solvent-extracted resins (SEU resins), deasphalted solvent-extracted oil (SEU oil) and fine-lean DCO in DCO-resin-oil line 92 is useful as part of the feed to the resid hydrotreating unit (RHU) 60 to increase the yield of more valuable lower-boiling liquid hydrocarbons, control the carbonaceous solids and eliminates cracking catalyst fines in the RHU.

A portion of the asphaltenes can be conveyed or passed through an asphaltene line or chute 94 or otherwise transported to a solid fuels mixing and storage facility 96, such as a tank, bin or furnace, for use as solid fuel. Another portion of the solvent-extracted asphaltenes (SEU asphaltenes) can be conveyed or passed through a SEU asphaltene line or chute 98 to the coker 76.

The effluent product streams discharged from the reactors comprise hydrotreated resid oil and reactor tail gas (effluent off gases). The tail gas comprises hydrogen, hydrogen sulfide, ammonia, water, methane, and other light hydrocarbon gases, such as ethane, propane, butane and pentane.

Heavy coker gas oil from line 100 (FIG. 1), and/or heavy vacuum gas oil (HVGO) from the heavy vacuum gas oil lines 48 (FIG. 2) are conveyed into an optional catalytic feed hydrotreater or catalytic feed hydrotreating unit (CFHU) 74 (FIG. 1). There, it is hydrotreated with hydrogen from hydrogen feed line 102 at a pressure ranging from atmospheric pressure to 2000 psia, preferably from 1000 psia to 1800 psia at a temperature ranging from 650° F. to 750° F. in the presence of a hydrotreating catalyst. The hydrotreated gas oil is discharged through a catalytic feed hydrotreatar discharge line 104.

Light atmospheric gas oil in RHU LGO line 68 and-/or primary gas oil in line 33 from the primary tower 26 (pipestill) can also be fed and conveyed into the catalytic cracking reactor 34. Kerosene can be withdrawn from the catalytic feed hydrotreating unit 74 (FIG. 1) through CFHU kerosene line 106.

Suitable cracking catalyst for the FCCU 34 include, but are not limited to, those catalysts which contain silica and/or alumina, especially the acidic type. The cracking catalyst may contain other refractory metal oxides such as magnesia or zirconia. The catalyst was described above in more detail.

Naphtha is withdrawn from the FCCU 34 through a naphtha line 108. LCCO is withdrawn from the FCCU through a light catalytic cycle oil line 110. HCCO is withdrawn from the FCCU product fractionation section through a heavy catalytic cycle oil line 112. Decanted oil is withdrawn from the bottom of the FCCU through a decanted oil line 114. The DCO contains fine particles of the catalyst (fines). These particles are detrimental to processing equipment. These particles are very difficult to remove by conventional processes such as filtering and centrifuging.

Our invention removes these particles by treating the DCO from the FCCU with resid. The DCO containing cracking catalyst fines can be fed to the SEU 88 via DCO feed line 116. In the SEU 88, the DCO is mixed with resid and/or solvent before being subjected to the solvent recovery steps.

As shown in FIG. 1, resid (i.e., RHU-VTB) in RHUVTB line 78 is fed into the coker (coking vessel) 76. Solvent-extracted asphaltenes in the SEU asphaltene line 118 can also be conveyed to the coker 76. In the coker 76, resids and solvent-extracted asphaltenes are coked at a coking temperature of about 895° F. to about 915° F. at a pressure of about 10 psig to about 50 psig. Coke is withdrawn from the coker 76 through chute, conduit, or line 120 and transported to a coke storage area for use as solid fuel.

In the coker tower 76, the coker product can be separated into fractions of coker gas, coker naphtha, light coker gas oil (LCGO), and heavy coker gas oil (HCG0). Coker gas can be withdrawn from the coker through cokar gas line 122. Coker naphtha can be withdrawn through coker naphtha line 124. Light coker gas oil can be withdrawn through light coker gas line 126. Heavy coker gas oil can be withdrawn through heavy coker gas oil line 100 and hydrotreated in the catalytic feed hydrotreater (CFHU) 74 before being catalytically cracked in the catalytic cracker 34 (FCCU).

The critical temperatures and pressures for the solvents generally used in this invention are as follows:

| | T (°F.) | P (psi) |
|---|---|---|
| butane | 307 | 530 |
| pentane | 387 | 484 |
| hexane | 455 | 435 |
| heptane | 512 | 395 |

Figure 3:
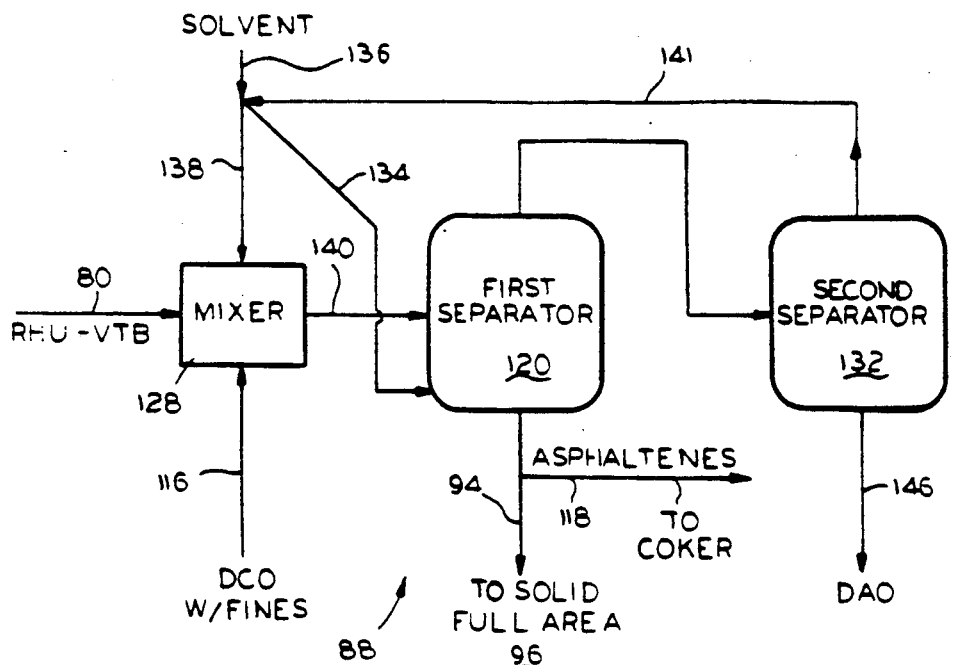
FIG. 3 is a schematic flow diagram of a two-stage solvent extraction unit.

In FIG. 3, the solvent extraction deasphalting unit 88 comprises a mixer 128 and two separator vessels or zones 130 and 132, which are operated slightly below or above the critical condition of the solvent. Resid hydrotreated vacuum tower bottoms (i.e., hydrotreated resid from the vacuum tower) in RHU-VTB line 80 is conveyed to the mixer, mixing vessel, or mixing zone 128.

For best results, the non-aromatic $C_3$–$C_7$ hydrocarbon solvent comprises substantially pentane and/or butane and/or isomers thereof. Decanted oil (DCO) containing cracking catalyst fines is mixed with the resid in mixer 128. The ratio of decanted oil to resid is from about 1:5 to about 3:2 and preferably from about 3:10 to about 3:2.

The resid may be a resid which has a substantial portion thereof having a boiling point above about 850° F. and preferably above about 1000+° F.

The decanted oil has a portion having a boiling point above about 850° F. and preferably above about 500° F.

In the preferred embodiment, a minority of fresh makeup solvent in fresh solvent line 136 is pumped through a combined solvent line 138 and into the mixer 128. A minority of recycled solvent in recycle solvent line 141 is also pumped through the combined solvent line 138 and into the mixer 128. Most of the fresh and recycled solvent is added directly to the first separator 130, via solvent feed line 134. This is added at the bottom portion of the separator 130 countercurrently to the DCO-resid mixture, in order to obtain countercurrent extraction of the asphaltenes in the first separator 130.

The ratio of total solvent (fresh and recycle solvent) to feed DCO-resid mixture is from about 3:1 to about 20:1 and preferably from about 8:1 to about 12:1 for best results. In some circumstances it may be desirable to use or include other solvents.

The resid (RHU-VTB), DCO with fines and a portion of the solvent are mixed in the mixer 128 and conveyed through a DCO-resid-solvent line 140 to the first separator vessel or zone 130. In some circumstances, it may be desirable that the decanted oil and the vacuum tower bottoms and solvent be fed directly into the first separator 130 in the above ratios without previously mixing the decanted oil and vacuum tower bottoms and solvent.

In the first separator (asphaltene separator) 130, there is formed an SEU asphaltene phase. The SEU asphaltene phase wets and therefore holds substantially all of the catalyst fines. The asphaltene phase is separated from the phase of decanted oil, solvent, SEU oil and resin. A substantial amount of the SEU asphaltenes are withdrawn from the first separator 130 through SEU asphaltene line 94 and following solvent recovery conveyed or otherwise transported to a solids fuel area 96 (FIG. 1) for use as solid fuel. Some of the solvent-extracted asphaltenes are withdrawn from the first separator and conveyed or otherwise transported through SEU asphaltene line, conduit, or chute 118 to the coker unit 76 or blended with No. 6 oil.

The first separator can be operated at a temperature from about 150° F. to near the critical temperature of the solvent and a pressure at least equal to the vapor pressure of the solvent when at a temperature below the critical temperature of the solvent and at least equal to the critical pressure of the solvent when at a temperature equal to or above the critical temperature of the solvent. Preferably, the operating temperature of the first separator 130 ranges from about 20° F. below the critical temperature of the solvent to about the critical temperature of the solvent. The operating pressure of the first separator 130 is substantially the same as the pressure of the second separator 132, plus the pressure drops between the vessels 130 and 132.

The majority of the solvent and the remaining fine-lean decanted oil, resins and oil components of the hydrotreated resid are withdrawn from the first separator 130 and conveyed through DCO-resin-oil-solvent line 142 and a heater or heat exchanger to the second separator vessel or zone 132. The second separator 132 is maintained at a temperature level higher than the temperature level in the first separator 130. This effects a separation of the influent residue into a light phase of solvent and a heavy phase comprising fine-lean decanted oil, SEU oils and resins (fine-lean DCO-resin-oil mixture). In the heavy phase, there is generally some solvent. The light phase collects in an upper portion of the second separator 132.

In the second separator (resin separator) 132, deasphalted resins, SEU oil and fine-lean decanted oil are separated from the solvent. The deasphalted fine-lean DCO-resin-oil mixture is discharged from the second separator 132 through a DCO-resin-oil line 146. Residual solvent may be stripped from the DCO-resin-oil mixture before the mixture is fed to the ebullated bed reactor of the resid hydrotreating unit as part of the feed as discussed previously.

The second separator 132 can contain a packing material, such as Demister packing, Pall rings, Raschig rings or the like.

If desired, the fine-lean DCO-resin-oil mixture from line 146 may be further separated by distillation.

Figure 4:
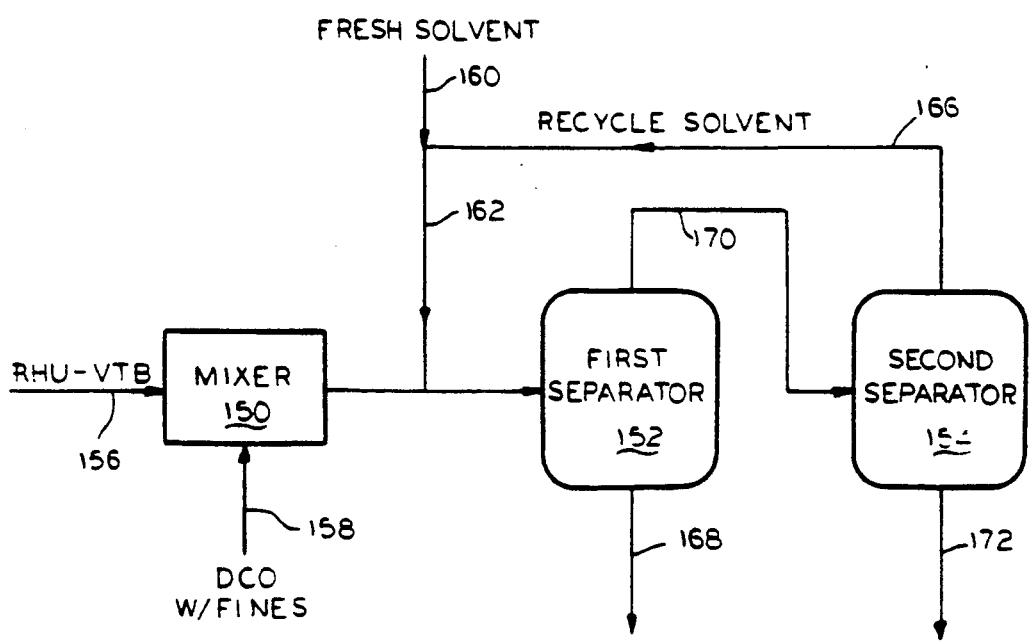
FIG. 4 is a schematic flow diagram of another two-stage solvent extraction unit for removing cracking catalyst fines from DCO.

Another alternative for substantially removing cracking catalyst fines from the DCO obtained from the FCCU is illustrated in FIG. 4.

In this embodiment, our purpose is to obtain a fine-lean ECO. The recovery of other valuable products is therefore not a primary purpose of this embodiment.

The solvent extraction deasphalting unit (SEU) of FIG. 4 comprises a mixer 150 and two separator vessel or zones 112 and 1I54. Resid (i.e., RHU-VTB) is conveyed via RHU-VTB line 156 to the mixer, mixing vessel, or mixing zone 150.

The DCO containing cracking catalyst-fines, which may be obtained from an FCCU, is pumped into the mixer 150 via DCO line 158. The ratio of DCO to resid in the mixer is from about 1:5 to about 3:2. The DCO and resid are mixed in the mixer 150.

Fresh makeup solvent in fresh solvent line 160 is pumped through a combined solvent line 162 into the first separator feed line 164. Recycled solvent in recycle solvent line 166 is also pumped through the combined solvent line 162 into the feed line 164. For best results, the solvent comprises substantially pentane and, or butane and/or isomers thereof, but can be selected from any non-aromatic hydrocarbon $C_3$–$C_7$ solvent. The total solvent (fresh and recycle solvent) to DCO-resid (vacuum tower bottoms) ratio is from about 3:1 to about 20:1 and preferably from about 8:1 to about 12:1 for best results. In some circumstances, it may be desirable to use or include other solvents.

Preferably, only a minority of the solvent is mixed with the DCO and vacuum tower bottoms in feed line 164. The majority of the solvent is injected countercurrently to the DCO-resid-mixture at the bottom portion of the separator 152 in order to obtain countercurrent contact with the resid in vessel (first separator) 152.

The resid, DCO with fines, and solvent are conveyed through the DCO-resid-solvent line 164 to the first separator vessel or zone 152. In some circumstances, it may be desirable that the RHU-VTB, DCO and solvent be fed directly into the first separator 112 in the above ratios without previously mixing the vacuum tower bottoms, DCO and solvent.

The first separator 152 may be operated at a temperature and pressure dependent on the solvent used. The purpose of the first separator is to provide contact between the resid, fine containing DCO and solvent wherein the fines or solids in the DCO are substantially removed from the DCO. Generally two phases are formed in the first separator 152 which are a resid phase which is generally a liquid phase of resid and asphaltene, and a DCO phase which is generally a mixture of DCO and solvent. The liquid resid phase wets and holds substantially all of the catalytic fines contained in the DCO. Thus, the resid phase, now containing the fines, is withdrawn from the first separator 152 through resid line 168 and conveyed or otherwise transported for further treatment.

The majority of solvent and fine-lean DCO are withdrawn from the first separator 152 and conveyed through DCO-solvent line 170 and a heater or heat exchanger (not shown) to the second separator vessel or zone 154. The second separator 154 is generally operated at a temperature level which is above the critical temperature level of the solvent and at least equal to the critical pressure of the solvent to effect a separation of the solvent and the fine-lean DCO. The solvent which separates within second separator 154 collects in an upper portion of the second separator 154 and is withdrawn by solvent recycle line 166.

The DCO, which is fine-lean, is discharged from the second separator 154 through a DCO line 172.

It was unexpectedly and surprisingly found that decanted oil containing cracking catalyst fines can be substantially cleaned of their fines by mixing the decanted oil with a resid and subjecting the resid to a solvent extraction process.

Further, it was unexpected and surprisingly found that mixing decanted oil with a hydrotreated resid from vacuum tower bottoms and subjecting these to multistage solvent extraction increases the recovery of valuable product and reduces the yield of asphaltenes in a non-additive manner.

EXAMPLE 1

Figure 2:
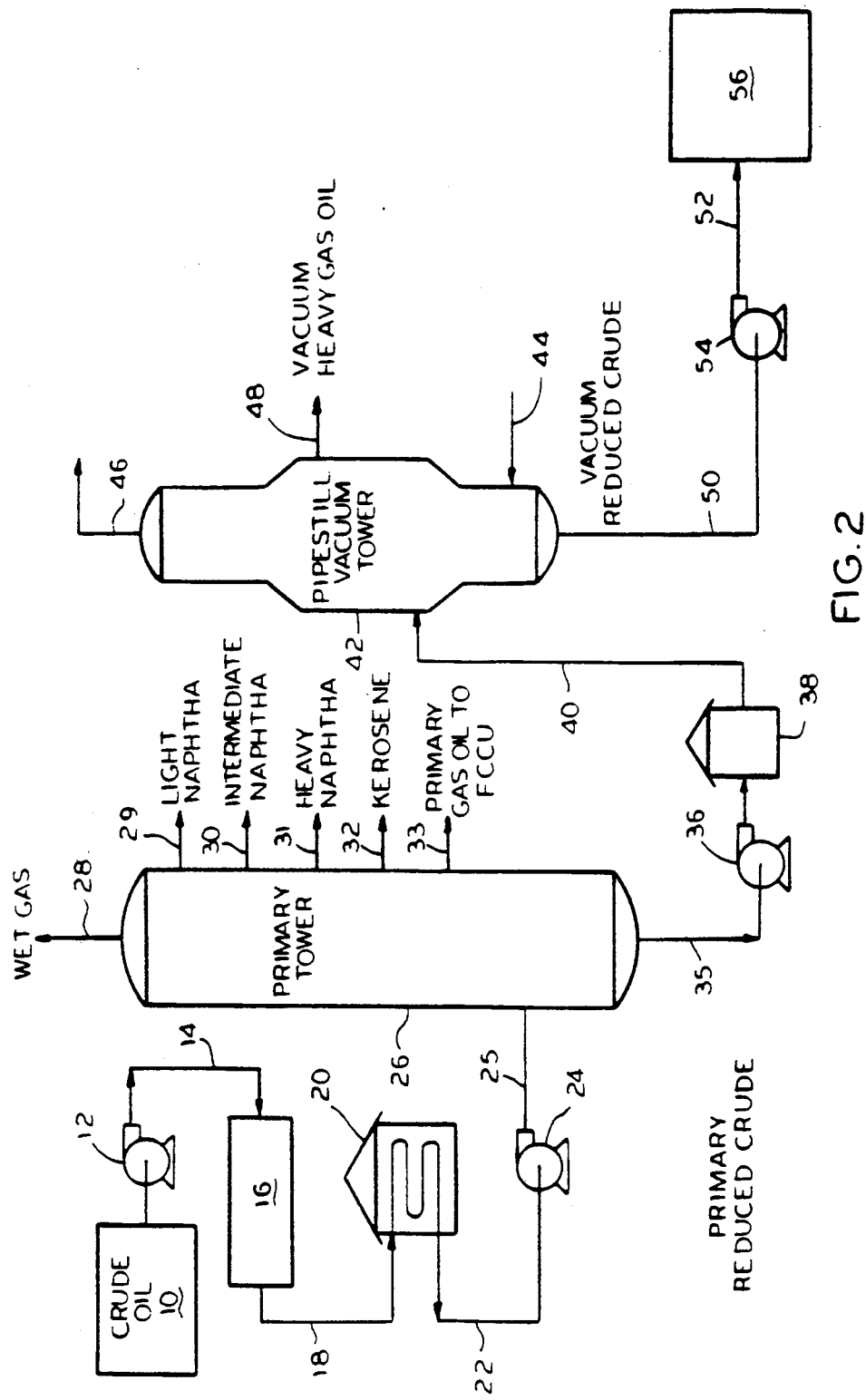
FIG. 2 is a schematic flow diagram for partially refining crude oil.

Vacuum-reduced crude (resid oil) was hydrotreated in a resid hydrotreating unit similar to that shown in FIGS. 1 and 2 and then in a deasphalter similar to that of FIG. 3 and under operating conditions similar to that described previously in this specification except that no decanted oil or low sulfur resid was added. The vacuum tower bottoms (hydrotreated resid) were separated by solvent extraction into fractions of asphaltenes, (deasphalted) resins and (deasphalted) deresined SEU oil. The composition of the hydrotreated resid, asphaltenes, resins, and SEU oil are shown in Table 1.

TABLE 1

|  | Oil | Resin | Asphaltene | FEED Sum of Products | Measured |
|---|---|---|---|---|---|
| Yield, Wt % | 40 | 36 | 24 | — | — |
| Carbon, Wt % | 87.08 | 87.18 | 88.78 | 87.52 | 87.53 |
| Hydrogen, Wt % | 10.77 | 10.29 | 6.40 | 9.55 | 9.38 |
| Sulfur, Wt % | 1.45 | 1.73 | 4.10 | 2.19 | 2.16 |
| Nitrogen, Wt % | 0.41 | 0.49 | 1.26 | 0.64 | 0.61 |
| Nickel, ppm | 0.9 | 2.8 | 169 | 42 | 39 |
| Vanadium, ppm | 1.0 | 3.1 | 354 | 86 | 76 |
| Iron, ppm | 0.6 | 0.6 | 43 | 11 | 6 |
| H/C, Atomic | 1.47 | 1.41 | 0.86 | 1.30 | 1.28 |
| RAMS carbon, Wt % | 8.2 | 14.4 | 70.4 | 25.4 | 26.6 |
| CCR, Wt % | 10.3 | 13.8 | 71.5 | 26.6 | 26.7 |
| API | 14.1 | 7.9 | (−24.5) | (2.6) | 2.6 |
| % $C_A$ | 33.8 | 38.3 | 73.9 | 45.0 | 44.8 |
| 1000−, Wt % | 25 | 11 | — | 14 | 18 |
| Ring and Ball, °F. | 112 | 95 | 377 | — | 112 |
| Viscosity @210 F., cSt | 70 | 128 | — | — | 764 |
| Viscosity @275 F., cSt | 20 | 31 | — | — | 101 |
| $C_5$ Insoluble, Wt % | 2.3 | 3.6 | 96.5 | 25.9 | 24.3 |
| $C_7$ Insoluble, Wt % | 1.9 | 2.5 | 93.7 | 24.7 | 16.5 |

EXAMPLE 2

The same RHU-VTB resid of Example 1 was deasphalted under operating conditions similar to that described previously in this specification. This example follows our invention wherein we use a DCO having a substantial portion boiling above about 850° F. which contains catalytic fines and is added to the mixer 128 (FIG. 3) and the bottom of the separator 130.

TABLE 2

|  | Oil | Resin | Asphaltene | FEED Sum of Products | Measured |
|---|---|---|---|---|---|
| Yield, Wt % | 64 | 11 | 25 | — | — |
| Carbon, Wt % | 87.86 | 87.95 | 89.21 | 88.21 | 88.12 |
| Hydrogen, Wt % | 10.19 | 9.33 | 6.17 | 9.09 | 9.05 |
| Sulfur, Wt % | 1.52 | 1.85 | 3.78 | 2.12 | 1.83 |
| Nitrogen, Wt % | 0.36 | 0.46 | 0.98 | 0.53 | 0.53 |
| Nickel, ppm | 0 | 0 | 161 | 40 | 41 |
| Vanadium, ppm | 0 | 4 | 393 | 99 | 108 |
| Iron, ppm | 0 | 0 | 73 | 18 | 22 |
| H/C, Atomic | 1.38 | 1.26 | 0.82 | 1.23 | 1.22 |
| Ramscarbon, Wt % | 7.9 | 18.2 | 67.3 | 24.0 | 26.0 |
| CCR, Wt % | 9.8 | 18.5 | 67.5 | 25.2 | 25.3 |
| API | 8.6 | 3.3 | (−18.4) | (1.2) | (1.2) |
| Ring and Ball, °F. | 127 | 116 | 361 | — | 110 |
| Viscosity @210 F., cSt | 63 | 271 | — | — | 591 |
| Viscosity @275 F.*, cSt | 18 | 47 | — | — | 80 |
| $C_5$ Insoluble, Wt % | 1.6 | 5.9 | 86.6 | 23.3 | 20.5 |
| $C_7$ Insoluble, Wt % | 0.6 | 3.5 | 80.5 | 20.9 | 15.8 |

EXAMPLE 3

The efficiency of our method for removing catalyst fines is shown by Example 3.

The RHU-VTB and DCO having a substantial portion boiling above about 850° F. was treated with a two stage solvent extraction deasphalter as shown in FIG. 3. Pentane was used as a solvent and the conditions were the same as Example 2.

The recovered asphaltene and DCO-oil-resin mixture were measured to determine the amount of silica and alumina which were removed from the feed.

TABLE 3

SILICA AND ALUMINA CONTENT FOR PRODUCTS FROM RHU-VTB/DCO 850°+ F.

|  | Silca (as Oxide) | | Alumina (as Oxide) | |
|---|---|---|---|---|
|  | $SiO_2$ ppm | % of Total | $Al_2O_3$ ppm | % of Total |
| Feed (Avg of 4 Tests) | 323 ± 16 | — | 478 ± 34 | — |
| Asphaltene (Avg of 5 Tests) | 800 ± 280 | 62 ± 22 | 1032 ± 282 | 54 ± 15 |

TABLE 3-continued

SILICA AND ALUMINA CONTENT
FOR PRODUCTS FROM RHU-VTB/DCO 850°+ F.

|  | Silica (as Oxide) | | Alumina (as Oxide) | |
| --- | --- | --- | --- | --- |
|  | SiO$_2$ ppm | % of Total | Al$_2$O$_3$ ppm | % of Total |
| Oils/Resins (Avg of 2 Tests) | 9 ± 4 | 2 ± 1 | 0.6 ± 0.1 | 0.1 ± 0.02 |

As Table 3 illustrates, the silica content in oils/resin stream is less than 9±4 ppm when the starting compound had 323±16 ppm silica and the alumina content in the oils/resins was 0.6± 0.1 ppm when the starting compound had 478±34 ppm alumina.

EXAMPLE 4

2,579 lbs. (6 drums) of RHU-VTB and 1,551 lbs. (4 drums of DCO) from Texas City #3 FCU was blended in a mixing kettle. The DCO has a substantial portion boiling above about 500° F.

A portion of the above feed was treated by the process set out above and as shown in FIG. 3. The deasphalted oil (DAO) which was obtained from line 146 of the second separator 132 was analyzed as well as the asphaltene obtained from line 94 of the first separator. The DAO comprises the DCO-resin-oil mixture mentioned above.

An average yield for this run of 0.5 wt% asphaltene and 89.5 wt% deasphalted oil (DAO).

The presence of the decanted oil caused a beneficial reduction in the asphaltene yield. The RHU-VTB used in this test had a slightly lower RAMS carbon content than the RHU-VTB used in previous tests (22.5 wt% vs. 26.6 wt%). Therefore, the asphaltene yield is expected to be slightly lower. Based on previous results for hydrocracked resids, the anticipated RHU-VTB asphaltene yield is 19 wt% (vs. 24 wt% in the previous tests). The present test with mixed feed actually yielded 10.5 wt% asphaltene overall, or 16.8 wt% on RHU-VTB (assuming no asphaltenes from decanted oil). If we conservatively assume that the decanted oil yielded 3% asphaltenes then the actual incremental asphaltene yield of the RHU-VTB is 15.0 wt%, 20% lower than the value expected in the absence of a co-solvent effect.

Table 4 presents inspections for two samples of the asphaltenes produced by this example. The properties are similar in most respects to those measured on asphaltenes from RHU vacuum tower bottoms (VTB) without decanted oil present except for lower sulfur content (which reflects lower sulfur in the RHU-VTB used as feed) and a slightly lower H/C (0.82 vs. 0.86). The lower H/C shows that the asphaltenes being rejected are more aromatic and less desirable as a hydrotreater feedstock.

TABLE 4

| Asphaltene Sample | |
| --- | --- |
| Carbon, wt % | 89.63 |
| Hydrogen, wt % | 6.15 |
| Sulfur, wt % | 2.05 |
| Nitrogen, wt % | 0.97 |
| H/C | 0.82 |
| Rams, wt % | 71.4 |
| % C$_A$ (NMR) | 77.4 |
| Oxide Ash, wt % | 0.8 |
| Moisture, wt % | 0.1 |
| % volatiles, wt % | 55.2 |

Referring to Table 5, the presence of the decanted oil significantly alters the DAO properties relative to DAO from RHU-VTB alone. As expected, decanted oil results in a decrease in nitrogen, H/C, RAMS carbon, and API gravity. It increased the aromaticity, yielding a better solvent for control of carbonaceous solids in the RHU.

TABLE 5

| DAO PROPERTIES | |
| --- | --- |
| Carbon, wt % | 88.52 |
| Hydrogen, wt % | 9.42 |
| Sulfur, wt % | 1.42 |
| Nitrogen | 0.34 |
| Ni, ppm | |
| V, ppm | |
| Fe, ppm | |
| H/C | 1.28 |
| RAMScarbon | 7.83 |
| % C$_a$ (NMR) | 50.3 |
| API | 5.7 |
| Oils | 32.7 |
| Resin | 66.9 |
| Asphaltenes | 0.4 |
| Viscosity | 22.92 CST @100° C. |
| Viscosity | 8.35 CST @135° C. |

A removal of erosive catalyst fines from decanted oil is one of the major functions of the present invention. The catalyst fines will be carried out with the asphaltene stream, leaving the DAO relatively fine-free.

Our best estimate is that 99% rejection of catalyst fines to the asphaltenes was achieved.

The yields and qualities of the deasphalted SEU oil, resins, and asphaltenes vary considerably with the solvent used in deasphalting and the deasphalting conditions. However, the property ranges given for deasphalted SEU oil, deasphalted resins, and deresined asphaltenes are appropriate for a broad range of process conditions in the use of deasphalters.

It is understood that the qualities of the deasphalted oil, deasphalted resin, and deresined asphaltene fractions can be adjusted somewhat by altering processing conditions in the deasphalter. This adjustment is analogous to raising or lowering the cut points on a distillation tower in order to obtain the product qualities desired.

Although embodiments of this invention have been shown and described, it is to be understood that various modification and substitutions, as well as rearrangements and combinations of process steps and equipment, can be made by those skilled in the art without departing from the novel spirit and scope of this invention. Therefore, the following claims are to be construed to include all equivalent structures, methods and processes.

We claim:

1. A method of deasphalting a hydrotreated resid and substantially removing cracking catalyst fines from decanted oil containing cracking catalyst fines comprising:

mixing said decanted oil containing cracking catalyst fines with said hydrotreated resid to provide a decanted oil-resid mixture, mixing a non aromatic $C_2$ to $C_7$ hydrocarbon solvent or mixtures thereof with said decanted oil-resid mixture in a first separator, feeding said decanted oil-resid mixture to said first separator, maintaining a temperature and pressure in said first separator at or below the critical conditions of said solvent to solvent extract asphaltene and a deasphalted oil-solvent mixture, recovering a substantially deresined solvent-extracted asphaltene from said first separator wherein said asphaltene contains a substantial amount of said cracking catalyst fines, recovering a substantially dasphalted oil-solvent mixture containing cracking catalyst fines with less than 20 ppm silica and less than 20 ppm alumina from said first separator, feeding said substantially deasphalted oil-solvent mixture from said first separator to a second separator, maintaining the temperature and pressure of said second separator temperature and pressure to solvent extract a substantially deasphalted oil and solvent from said substantially deasphalted oil-solvent mixture, recovering a substantially deasphalted oil containing cracking catalyst fines with less than 20 ppm silica and less than 20 ppm alumina, from said second deparator, recovering solvent from said second separator, and recycling at least a portion of said solvent from said second separator to said first separator.

2. The method of claim 1 wherein a substantial portion of the decanted oil boils above about 850° F.

3. The method of claim 1 wherein a substantial portion of the decanted oil boils above about 850° F.

4. The method of claim 1 wherein the resid is a vacuum tower bottom resid obtained from high sulfur crude and the solvent is selected from the group consisting of butane, pentane, isomers thereof and mixtures thereof.

5. A method of purifying decanted oil obtained from a catalytic cracker and containing cracking catalyst fines comprising:

mixing a hydrotreated resid with said decanted oil to provide a decanted oil-resid mixture containing cracking catalyst fines, mixing a non-aromatic hydrocarbon solvent with said decanted oil-resid mixture containing said cracking catalyst fines wherein said non-aromatic hydrocarbon solvent is selected from the group consisting of hydrocarbon solvents having 3 to 7 carbon atoms and mixtures thereof, conveying said decanted oil-resid mixture containing said cracking catalyst fines and said solvent to a first separator, maintaining said first separator at a temperature and pressure at or below the critical conditions of said solvent, to form a substantially fine-lean decanted oil-solvent phase and a liquid phase of resid and asphaltene in said first separator, recovering fine-lean decanted oil-solvent mixture from said first separator, conveying said fine-lean decanted oil-solvent phase from said first separator to a second separator, maintaining said second separator at a temperature and pressure to separate substantially catalyst free decanted oil from said fine-lean decanted oil-solvent phase, recovering said solvent from said fine-lean decanted oil-solvent phase in said second separator, and recovering said substantially catalyst free decanted oil from said second separator.

6. The method of claim 5 wherein at least a portion of the solvent and a portion of solvent recovered from the second separator are added directly to the first separator.

7. The method of claim 5 wherein a substantial portion of the decanted oil boils above about 850° F.

8. The method of claim 5 wherein a substantial portion of the decanted oil boils above about 500° F. and is obtained from a catalytic cracker.

9. The method of claim 5 wherein in the resid is a hydrotreated vacuum tower bottom resid obtained from high sulfur crude, and the solvent is selected from the group consisting of butane, pentane isomers thereof, and mixtures thereof.

10. A hydrotreating process comprising the steps of:

hydrotreating a resid with hydrogen in the presence of a hydrotreating catalyst to produce a hydrotreated resid, containing hydrotreating catalyst fines;

mixing a fraction of the hydrotreated resid with a decanted oil containing cracking catalyst fines to produce a mixture, solvent extracting a catalyst enriched asphaltene stream from said mixture with a solvent comprising a non-aromatic hydrocarbon solvent containing 3 to 7 carbon atoms, and combinations thereof;

said catalyst enriched asphaltene stream comprising asphaltenes and a substantial amount of said hydrotreating catalyst fines and said cracking catalyst fines;

separating a substantially catalyst free stream of resins of deasphalted oil from said solvent extracted mixture;

separating a spent solvent stream of solvent from said solvent extracted mixture; and hydrocracking said catalyst free stream of resins and deasphalted oil in a hydrotreating unit with hydrogen in the presence of a hydrogenation catalyst to produce upgraded oil.

11. The process of claim 10 comprising mixing at least a portion of the hydrotreated resid with a decanted oil containing cracking catalyst fines, feeding the decanted oil, hydrotreated resid and said hydrocarbon solvent to a first stage of a two-stage solvent extraction unit, maintaining a temperature and pressure in said first stage to solvent extract asphaltene and a decanted oil-resin-oil-solvent in said first stage, recovering a substantially deresined solvent-extracted asphaltene from said first stage wherein said asphaltene contains a substantial amount of the cracking catalyst fines, recovering a substantially deasphalted decanted oil-resin-oil-solvent mixture containing cracking catalyst fines with less than 20 ppm silica and less than 20 ppm alumina from said first stage, feeding said substantially deasphalted decanted oil-resin-oil-solvent mixture from said first stage to a second stage, maintaining the temperature of said second stage at a temperature and pressure to solvent extract a substantially deasphalted decanted oil-resin-oil mixture and solvent from said substantially deasphalted decanted oil-resin-oil-solvent mixture,
recovering a substantially deasphalted decanted oil-resin-oil mixture having less than 20 ppm silica and less than 20 ppm alumina, from said second stage,
recovering solvent from said second stage and
recycling at least a portion of said solvent from said second stage to said first stage.

12. The process of claim 11 wherein the resid being hydrotreated is selected from the group consisting of high sulfur resid, low sulfur resid and mixtures thereof.

13. The process of claim 1 wherein a substantial portion of the decanted oil boils above about 850° F.

14. The process of claim 11 wherein a substantial portion of the decanted oil boils above about 500° F.

15. The process of claim 12 wherein the resid is a high sulfur crude and the solvent is selected from the group consisting of butane, pentane, isomers thereof and mixtures thereof.

16. The process of claim 11 wherein the solvent is selected from the group consisting of butane, pentane, isomers thereof and mixtures thereof, maintaining the temperature in the first separator from about 150° F. to near the critical temperature of the solvent and the pressure from about the vapor pressure of the solvent to about the critical pressure of the solvent.

17. The process of claim 16 wherein a substantial portion of the decanted oil boils above 850° F.

18. The process of claim 16 wherein a substantial portion of the decanted oil boils above 500° F.

19. A hydrotreating process, comprising the steps of:
substantially desalting crude oil;
heating said desalted crude oil in a pipestill furnace;
pumping said heated crude oil to a primary distillation tower;
separating said heated crude oil in said primary distallation tower into streams of naphtha, kerosene, primary gas oil, and primary reduced crude oil;
pumping said primary reduced crude oil to a pipestill vacuum tower;
separating said primary reduced crude in said pipestill vacuum tower into streams of wet gas, heavy gas oil, and vacuum reduced crude oil providing virgin unhydrotreated resid oil;
feeding a composite feed comprising solvent extracted resins, deasphalted oil and said virgin unhydrotreated resid oil to a resid hydrotreating unit comprising a series of ebullated bed reactors;
injecting hydrogen-rich gases into said ebullated bed reactors;
conveying resid hydrotreating catalysts to said ebullated bed reactors;
ebullating said composite feed comprising said solvent extracted resins, deasphalted oil and said virgin unhydrotreated resid oil with said hydrogen-rich gases in the presence of said hydrotreating catalyst in said ebullated bed reactors under hydrotreating conditions to produce upgraded hydrotreated resid oil containing hydrotreating catalyst fines;
separating said upgraded hydrotreated resid oil into vacuum tower bottoms comprising vacuum resid oil containing said hydrotreating catalyst fines;
mixing at least a portion of said vacuum tower bottoms with a decanted oil containing cracking catalyst fines to form a mixture,
solvent extracting a catalyst laden stream from said mixture with a solvent comprising a non-aromatic hydrocarbon solvent and mixtures thereof containing 3 to 7 carbon atoms, in stage one of a two stage solvent extraction unit,
said catalyst laden stream comprising substantially derisined asphaltenes and a substantial amount of said hydrotreating catalyst fines and a cracking catalyst fines;
separating the residual solvent extracted mixture in stage two of said solvent extraction unit into two catalyst lean streams having a substantially smaller concentration of catalyst fines than said mixtures, said first catalyst lean stream comprising spent solvent, and said second catalyst lean stream comprising resins and substantially deasphalted oil, and;
recycling said second catalyst lean stream of resins and deasphalted oil to said ebullated bed reactors as part of said composite feed.

20. The process of claim 19 comprising, mixing a fraction of said vacuum tower bottoms with a decanted oil containing cracking catalyst fines,
feeding said decanted oil and vacuum tower bottoms to said first stage of a two-stage solvent extraction unit, and
maintaining the temperature and pressure of said first stage from about 150° F. to near the critical temperature of the solvent and from about the vapor pressure of the solvent to about the critical pressure of the solvent.

21. The process of claim 20 comprising recovering a substantially deasphalted decanted oil-resin-oil-solvent mixture containing cracking catalyst fines with less than about 20 ppm silica and less than about 20 ppm alumina from said first stage,
feeding said substantially deasphalted decanted oil-resin-oil-solvent mixture from said first stage to said second stage,
recovering a substantially deasphalted decanted oil-resin-oil mixture having less than about 20 ppm silica and less than 20 ppm alumina, from said second stage, and
recycling at least a portion of said first catalyst lean stream of solvent from said second stage to said first stage.

22. A method of deasphalting a hydrotreated resid and substantially removing cracking catalyst fines from decanted oil containing cracking catalyst fines, comprising:
mixing said decanted oil containing cracking catalyst fines with said hydrotreated resid to provide a decanted oil-resid mixture,
mixing a non aromatic $C_3$ to $C_7$ hydrocarbon solvent or mixtures thereof with said decanted oil-resid mixture before a first separator,
feeding said decanted oil-resid mixture to said first separator,
maintaining a temperature and pressure in said first separator at or below the critical conditions of said solvent to solvent extract asphaltene and a deasphalted oil-solvent mixture,
recovering a substantially deresined solvent-extracted asphaltene from said first separator wherein said asphaltene contains a substantial amount of said cracking catalyst fines,
recovering a substantially deasphalted oil-solvent mixture containing cracking catalyst fines with less than 20 ppm silica and less than 20 ppm alumina from said first separator, feeding said substantially deasphalted oil-solvent mixture from said first separator to a second separator, maintaining the temperature and pressure of said second separator temperature and pressure to solvent extract a substantially deasphalted oil and solvent from said substantially deasphalted oil-solvent mixture, recovering a substantially deasphalted oil containing cracking catalyst fines with less than 20 ppm silica and less than 20 ppm alumina, from said second separator, recovering solvent from said second separator, and recycling at least a portion of said solvent from said second separator to said first separator.

* * * * *

UNITED STATES PATENT OFFICE
CERTIFICATE OF CORRECTION

Patent No. 5,124,027             Dated June 23, 1992

Inventor(s) William I. Beaton, James L. Taylor, Jeffrey J. Kolstad, Brian S. Kennedy, Robert D. Hughes It is certified that error appears in the above-identified patent and that said Letters Patent is hereby corrected as shown below:

| Col. | Line | |
|---|---|---|
| 9 | 27 | "feed hydrotreatar" should be --feed hydrotreater-- |
| 11 | 63 | "zones 112 and 1I54" should be --zones 152 and 154-- |
| 14 | 5 | "(FIG.3) and the bottom of the separator 130." should be --(Fig. 3). Properties of the products obtained are presented in Table 2.-- |
| 15 | 29 | "this run of 0.5 wt%" should be --this run of 10.5 wt%-- |
| 16 | 23-5 | "Ni,ppm" should be --Ni,ppm  <2-- <br> "V,ppm" should be --V,ppm  <2-- <br> "Fe,ppm" should be --Fe,ppm  <2-- |
| 17 | 4 | "aromatic $C_2$ to $C_7$ hydrocarbon" should be --aromatic $C_3$ to $C_7$ hydrocarbon-- |
| 17 | 30 | "deparator" should be --separator-- |
| 17 | 37 | "above about 850°F." should be --above about 500°F.-- |

Signed and Sealed this

First Day of February, 1994

Attest:

BRUCE LEHMAN

Attesting Officer         Commissioner of Patents and Trademarks